May 13, 1924.
L. W. KUHLMAN
1,494,120
IMPLEMENT FOR TRIMMING THE EDGES OF LAWNS
Filed April 17, 1922
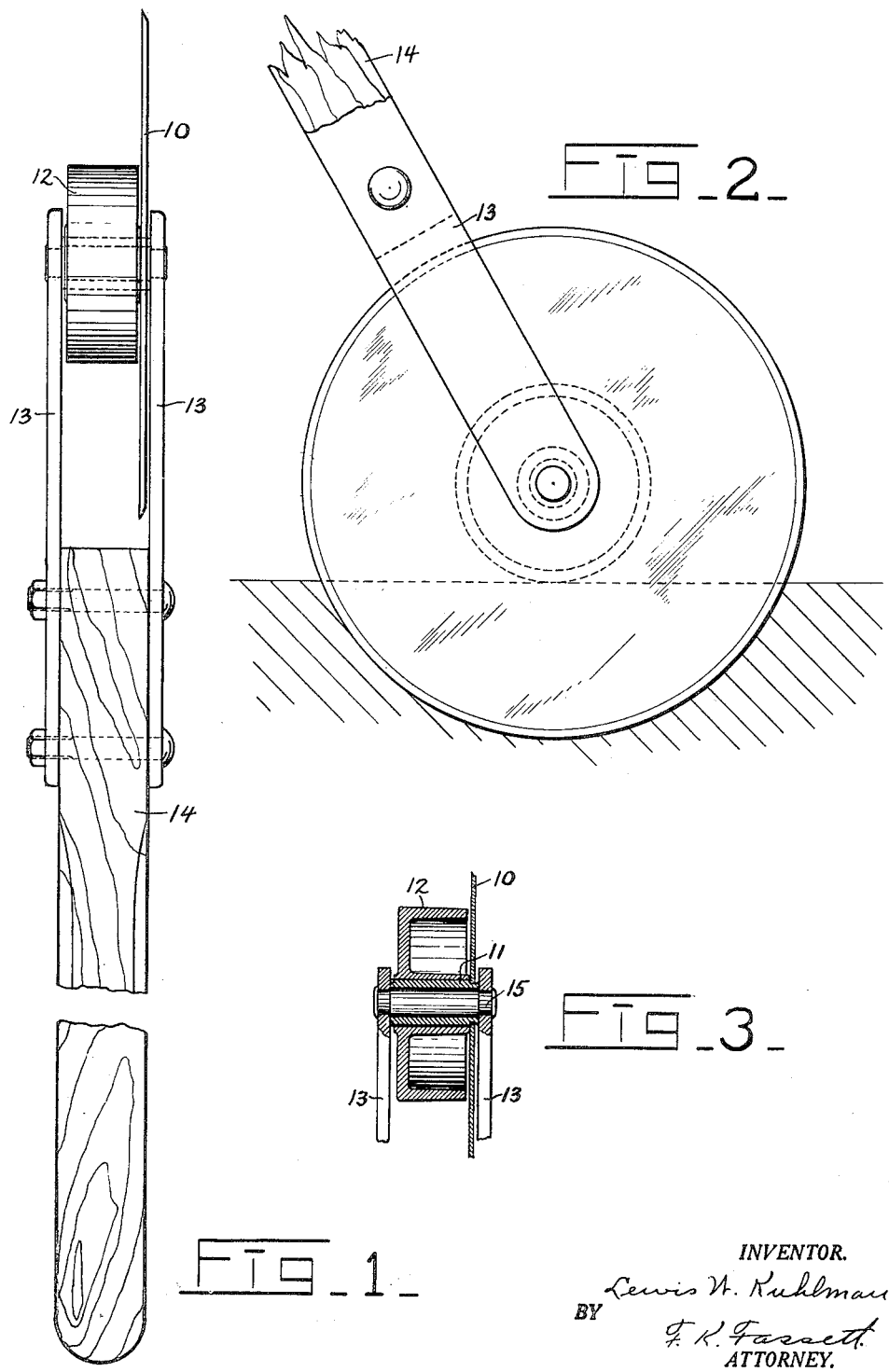
INVENTOR.
Lewis W. Kuhlman,
BY
F. K. Fassett
ATTORNEY.

Patented May 13, 1924.

1,494,120

UNITED STATES PATENT OFFICE.

LEWIS W. KUHLMAN, OF DAYTON, OHIO.

IMPLEMENT FOR TRIMMING THE EDGES OF LAWNS.

Application filed April 17, 1922. Serial No. 553,942.

*To all whom it may concern:*

Be it known that I, LEWIS W. KUHLMAN, a citizen of the United States, residing at Dayton, in the county of Montgomery and State of Ohio, have invented a new and useful Implement for Trimming the Edges of Lawns, of which the following is a specification.

My invention relates to implements for trimming the edges of lawns, and it is especially adapted to trim the edge contiguous to walks and the like.

I am aware that implements of this class are not new, but my invention embodies certain features which are not only novel but contribute very much to the convenience and effectiveness of the implement. The principal object of my invention is to produce a tool which may be used by any unexperienced person. This object is attained by providing a guide roller beside the circular cutting blade, which prevents the blade sinking too deep into the ground, while permitting more pressure on the handle than would otherwise be permissible, especially in soft ground. This roller is also useful in trimming the edges which abut on the walks, the roller running along the edge of the walk while the blade runs beside the walk.

Another object of my invention is to produce an implement of rugged construction, one which may be used indefinitely without being resharpened, and at the same time keep the cost low enough to attract purchasers of even very meagre means.

In the accompanying drawing,

Figure 1 is a view of my implement as a whole,

Figure 2 illustrates one of the functions of the guide roller; in this case the roller is moving along the edge of a walk, while the circular blade trims the edge of the lawn adjacent to the walk, and Figure 3 is a fragmental view, in section, showing the construction of my implement.

The blade 10 is made, preferably, of steel so thin that it need not be sharpened, that is, so thin as to cut readily without sharpening. A hub 11 is staked in the center of the blade, and freely mounted on the outside of this hub is a roller 12. The blade and roller are mounted in a bifurcated handle composed of two flat strips 13, bolted to a wooden shaft 14, the strips being pierced to receive an axle 15, whose ends are headed down to hold it in place in the strips.

The implement may be used with the roller 12 at either the right or left side of the blade, and the preferred way to operate it is to hold the handle at about the angle shown in the Figure 2 and push it forward; or better still, move it alternately forward and backward, but gradually advancing it. The roller 12 being revoluble on the hub 11, enables the roller and blade to operate independently of each other and this contributes considerably to the effectiveness of the tool. The freedom of movement allowed the roller enables it to roll along the ground or grass and permits much more pressure to be put upon the handle than would be possible if the roller were not present, as there is a tendency for the blade to sink into the ground until the ends of the fork drag, and this impedes the work.

While I have illustrated what I now regard as the preferred embodiment of my invention, I do not wish to limit myself to the construction shown, as various modifications are possible while remaining within the spirit of my invention, whose scope is limited only by the appended claim.

What I claim is as follows:

An implement for trimming the edges of lawns, comprising a circular blade having a tubular hub rigidly secured in its axis, an axle traversing said hub on which said blade rotates, a bifurcated mounting for the axle, and a guide roller mounted to rotate on said hub contiguous to said blade, said roller being much smaller in diameter than said blade, and adapted to roll along a walk or the like and act as a guide for the blade while the latter trims the edges of the lawn contiguous to the walk.

LEWIS W. KUHLMAN.